Sept. 4, 1928.

J. J. GARDNER 1,682,781

MOTOR VEHICLE CONTROL SYSTEM

Filed April 16, 1926     4 Sheets-Sheet 3

INVENTOR
John J. Gardner
BY Rogers, Kennedy & Campbell,
ATTORNEYS,

Patented Sept. 4, 1928.

1,682,781

UNITED STATES PATENT OFFICE.

JOHN J. GARDNER, OF NEW YORK, N. Y.

MOTOR-VEHICLE CONTROL SYSTEM.

Application filed April 16, 1926. Serial No. 102,598.

This invention is a novel motor vehicle control system, adapted especially for road vehicles and preferably operating through fluid pressure connections, although other connections could be substituted in regard to certain features of the invention.

The general object of the invention is to afford control from the driving seat of the vehicle of various parts, elements and operations, as will be more particularly enumerated and described. Each of the control operations and the means therefor may be considered as an independent part of the invention; while the intercombinations of the related controls, and the cooperating mechanisms therefor, and the modes of coordination thereof, constitute other important features of the invention.

A particular object of the invention is the controlling of the vehicle brakes in an improved manner, this referring to the applying and releasing of the brakes, and the locking of the brakes in applied position when desired; and a further object is to afford a selective system whereby the front brakes can be controlled independently of the rear brakes, also whereby the left rear brake can be controlled independently of the right rear brake, and vice versa, as desired, as well as controlling the several brakes in unison. Further particular objects are to give operation and control of any or all of the following elements or parts, namely, a switch or circuit closer controlling the self starter, to be opened or closed under particular conditions; a device for locking the transmission against adjustment or shifting, to be locked or unlocked under the control hereof; devices for locking the hood at the two sides; bolts for locking or bolting the vehicle doors; a switch or circuit closer controlling the ignition circuit; and a switch or contact for putting an audible alarm into operation under certain conditions. For example, in the full embodiment, by a certain setting of the selective adjustments, and applying the fluid or hydraulic pressure, when the vehicle is to be parked, the following operations may take place; the front and rear brakes are all applied and there locked; the self starter circuit is opened to prevent operation; the transmission and hood are locked, and the doors bolted; the ignition circuit opened to prevent engine operation; and an alarm set so that any tampering or release of the control will sound the alarm. Among other adjustments is that for braking one only of the driving wheels, so that when such wheel is in a mud hole it may be prevented from spinning and thus enable the opposite wheel to give traction to drive the car. Other and further objects of the invention will be explained in the hereinafter following description or will be apparent to those conversant with the subject.

To the attainment of the objects and advantages referred to the present invention consists in the novel motor vehicle control system, and the novel features of combination, coordination, arrangement, operation, construction and detail herein illustrated or described.

In the accompanying drawings

Figure 1:
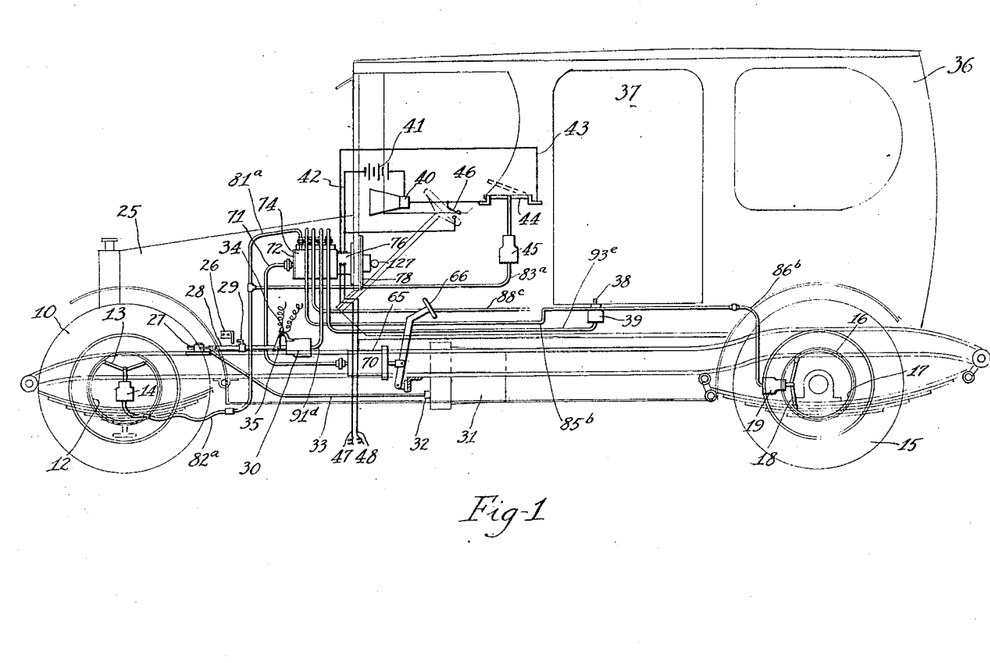
Fig. 1 is a diagrammatic left side elevation of an embodiment of the invention, with the motor car indicated in outline, the control system being largely in diagram but showing generally the relative positions and connections of the elements.
Figure 2:
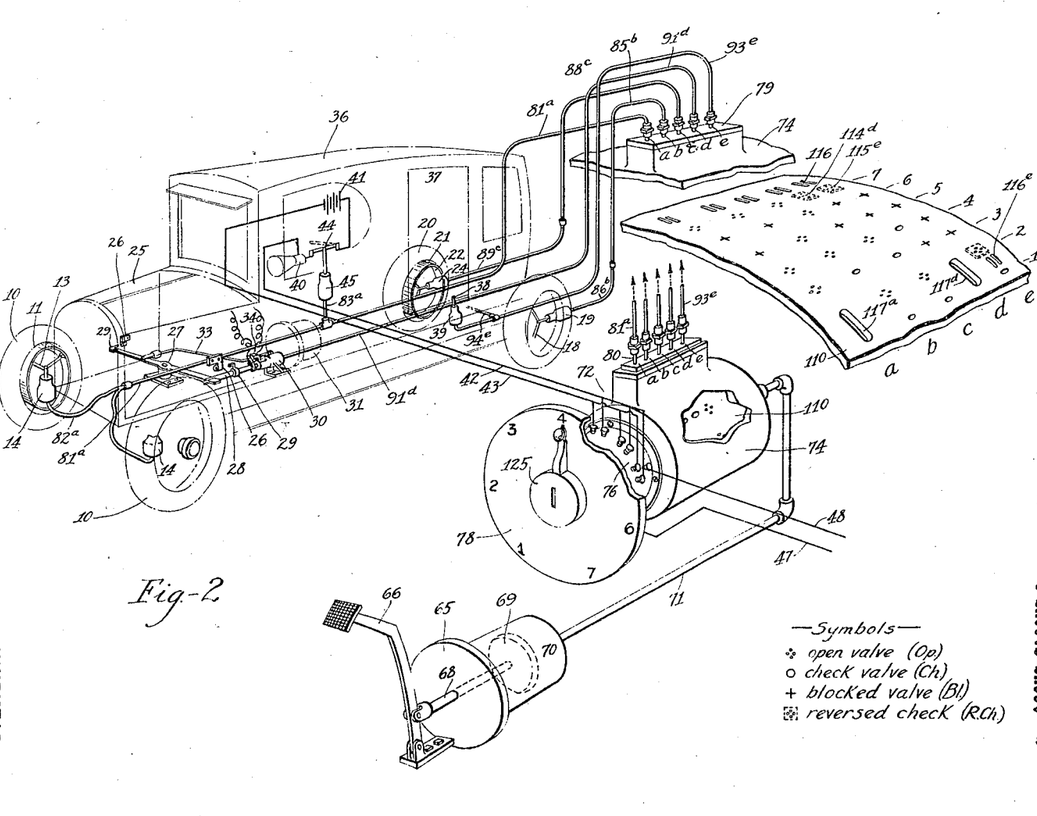
Fig. 2 is a diagram in perspective and upon a larger scale, with certain mechanical parts separated, broken away or developed to show more fully the structure.

Figs. 1 and 2 show the front wheels 10, each having a brake drum, rim or flange 11 cooperating with a brake ring or band 12, or other analogous device for retarding rotation of the wheel. Frictional pressure for example may be applied by a toggle 13, straightened to expand the brake band within the rim 11. An actuating device in the form of a fluid pressure motor 14 is indicated, arranged for thrusting the toggle for the described purposes.

The use of a hydraulic or fluid pressure motor for applying a brake is not broadly claimed, but in connection with Fig. 6 will be described a novel and preferred motor particularly adapted for the purposes of the invention, and the principles of which may be used not only for the wheel brakes but for operating various other parts and elements as will be described. Hydraulic motors and operating connections are preferred, for example, cylinder and piston devices and connecting passages, containing a thin oil, which may be subjected to pressure at will to operate the motors; and in using the term fluid or fluid pressure it is not intended to limit the invention to a liquid as in some cases the fluid might be a suitable gas, such as air; moreover the invention is not intended to be limited for all purposes to a fluid pressure system since various features of operation, construction and coordination might be carried out through other types of connecting or transmitting means controlled from the central point, such as mechanical or electrical. The distinction will be brought out in the claims, which are not intended to be limited to fluid or hydraulic pressure connections and motors except where so specifically set forth.

The rear wheels may be braked independently of the front wheels and independently of each other. The left rear wheel 15 is shown as having a brake drum 16 engaged by a brake band 17 operated by a toggle 18 actuated by a fluid motor 19. The right rear wheel 20 has a corresponding brake drum 21 engaged by brake band 22, operated by toggle 23, actuated by motor 24.

Other parts and elements of the vehicle which may be controlled by the present invention are the following. The hood 25 comprising the usual hinged sides, is to be locked in closed position. For this purpose each side of the hood, at the interior, is shown provided with a locking lug or hook 26. A locking bar or lever 27 may be located in any convenient place and is shown arranged to swing about its central pivot for locking and unlocking the hood, the lever being actuated by a rod 28. A pair of locking members or hooks 29 are shown, one on the lever 27 and the other on the rod 28, these being in open or unlocked position in Figs. 1 and 2, but adapted to be shifted to engage the lugs 26 and thus lock both sides of the hood. A fluid motor 30 is indicated, arranged for shifting the rod 28 and thus effecting the locking and unlocking operation.

The transmission 31 is indicated in outline, and in connection with it a device or rod 32 arranged to slide inwardly and outwardly for locking and unlocking the parts of the transmission against movement or adjustment. The rod 32 may be extended at 33 and connected to the swinging lever 27, as shown. By this arrangement when the motor 30 is operated to swing the lever 27 this will lock the transmission as well as the hood.

Another control element is a circuit closer or switch 34 for the self starter. The circuit by which the self starter is operated is caused to pass through the switch 34 so that when the switch is opened this renders the starter inoperative. A connection 35 is shown from the rod 28 to the switch 34 so that when the motor 30 is operated this will open the switch.

The car body 36 has doors 37, and by this invention these doors, excepting a forward door, may be locked closed from the central control. Thus the left rear door 37 is shown as having a locking bolt 38 operating from any suitable position, for example upwardly through the sill, to lock the door shut. Each door bolt may be operated by a fluid motor 39, or several bolts by one motor.

Another controlled element is an audible alarm or sounder, which may conveniently be the usual horn 40 of the vehicle, electrically operated. A battery 41 is indicated as a source of energy for the horn and the two are arranged in series in a circuit composed of conductors 42 and 43. At a convenient part of the circuit is shown a switch or circuit opener 44, which is normally closed but which may be opened by a fluid motor 45 when the fluid is under pressure. This is in series with a second switch, yet to be described in conjunction with their joint operation. The usual button or contact 46 for horn operation is shown, using the same source of current and part of the circuit 42, 43.

Another element is the ignition circuit for the engine indicated in the form of conductors 47 and 48, extending to the engine, not shown. By opening this circuit at a suitable point the engine is rendered inoperative. This it is preferred to accomplish herein, not through a fluid motor, but directly from the selector device to be described.

The particular connections for controlling and operating each of the described parts and elements, as well as the coordination of such controls in order to afford facility and effectiveness of control, will be later fully described.

Figures 6, 7:
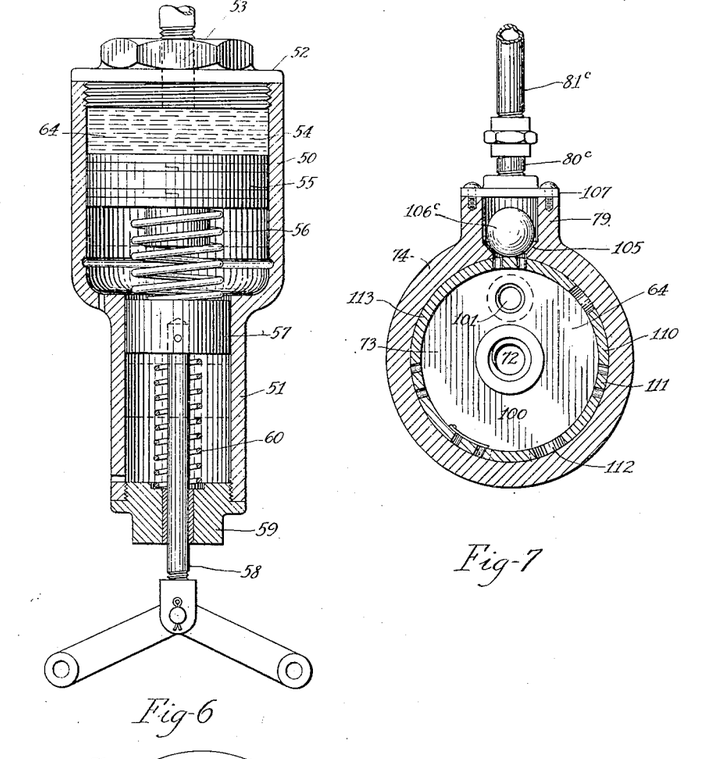
Fig. 6 is a central longitudinal selection of one of the motive devices or motors used at various points in the system, for example, the motor for actuating one of the rear wheel brakes.
Fig. 7 is a transverse section taken on the line 7—7 of Fig. 3, looking from the front.
Figure 8:
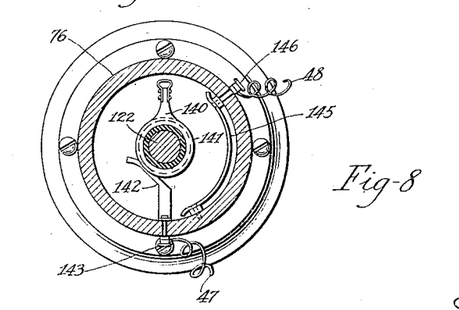
Fig. 8 is a transverse section taken on the line 8—8 of Fig. 3, looking from the front.

Each of the motive devices or fluid motors already referred to, for instance the motors pertaining to the rear wheel brakes, may advantageously be constructed on the principles indicated in Fig. 6. A cylinder or casing 50 is shown, the forward end of which is reduced to form a cylindrical guide 51. The cylinder 50 is sealed at its end by a head 52 through which is formed a central fluid passage 53 entering the cylinder chamber 54. A piston 55 is fitted in the cylinder to move endwise under the pressure of the operating fluid. As will be described this invention provides for the application of fluid pressure to operate the motor by shifting its piston 55, to apply the brake or other element, and locking the parts in such position, for example to maintain the brakes continuously in effect, this preferably being done by a check valve or other means preventing the return of the liquid to its source or central pressure chamber. If the piston 55 were directly connected to the toggle 13 which operates the brake there would be a practical defect in that possible leakage would allow movement of the piston and release of the brake; and this is overcome by this invention through the introduction of a resilient or compressible cushion device intermediate the moved element or piston of the motor and the actuating device or toggle of the brake. While various such cushioning means will serve the purpose, Fig. 6 shows for illustration a cushioning spring 56 which directly takes the thrust of the piston 55 under the hydraulic pressure. The cushion 56 is arranged between the piston 55 and a head or guide 57 shown slidable longitudinally in the cylindrical guide or extension 51. A rod 58 connects the guide 57 to the middle pivot of the toggle device 13. The forward end of the extension 51 is shown closed by a screw head 59 in which the transmitting rod 58 centrally slides. A relatively light coil spring 60 is shown extending between the fixed head 58 and the sliding guide 57, in order to restore the parts to the normal position shown in Fig. 6, when the fluid pressure is removed from the piston 55.

The operation of the described fluid pressure motor is as follows. When operative pressure is put upon the fluid causing it to enter the chamber behind the piston it thrusts forcibly on the piston and throws it forward to an extent varying with the pressure, and thus, through the elastic device 56 and elements 57 and 58, transmitting the movement to the brake toggle and applying the brake with more or less force. By applying the liquid pressure to the maximum extent the piston 55 can be thrown clear forward so as to compress the spring 56 to the maximum and thus apply the brake with maximum force. The parts can be substantially locked in this position by closing a liquid valve or otherwise checking the return of the liquid from the motor chamber. If any leakage of liquid takes place, even to an appreciable extent, this will not soon release the brake but will merely cause the backing down of the piston 55 and relaxing somewhat of the pressure transmitted by the cushion or spring 56, the cushion expanding but maintaining operative pressure upon the guide 57 and brake toggle. The return spring 60 will be insufficiently strong to impair the transmitting action of the cushion spring 56 when under compression, but strong enough to restore the guide 57 to normal as the spring 56 restores the piston to normal, and thereby force the relaxed liquid from the motor cylinder back into the pressure lines, and restore the pressure pedal to normal.

The cushion element 56 can in some cases be dispensed with. Thus the pipe line to the front brake motors 14 also feeds the switch motor 45, and the cushion element in the latter will be sufficient to take up slack due to liquid loss in the pipe line, so that plain motors without cushion springs, but only return springs, can be used for the front brakes. In fact a separate cushion element can be applied at any point in the pipe line and take care of the entire group, permitting ordinary motors to replace the special one described.

The motor springs can be of predetermined strength for their purposes. Thus they can be selected so that thirty pounds per square inch hydraulic pressure, for example, will effectively apply the front brakes; and the motor 45 may be such that the switch 44 will be open with a pressure of thirty pounds or more, but will close with a substantially less pressure. A pressure gage can be applied to judge the conditions.

The pressure medium or fluid 64 is preferably a thin oil or analogous liquid. The entire system of chambers and piping is to be considered as at all times completely charged with the liquid and free of air or gas, the total volume of liquid such as to fully recharge all the motors at one extreme, and relieve all of them at the other extreme adjustment.

The source of pressure or means for generating pressure in the fluid of the system may be of any suitable sort. A pressure generator 65 is shown consisting of a pedal 66 adapted to be thrust by the foot and thereby press the rod 68 of a piston 69 working in a pressure cylinder 70, constituting a pump and being the master cylinder of the system. Muscular effort is satisfactory for all ordinary purposes, but the pressure pedal might be replaced by other devices. The pressure cylinder and piston are to be of such diameter, not too large, that with a moderate pedal movement a quantity of liquid can be forced out of the pressure generator sufficient to effect the necessary movements in all of the several fluid motors of the system. The return of the pedal may be by the return flow of the liquid from the motors, caused by the springs 56 and 60, and a very light spring may be applied to the pedal for thrusting it against the transmitting liquid, thus minimizing entry of air into the hydraulic system.

Figure 3:
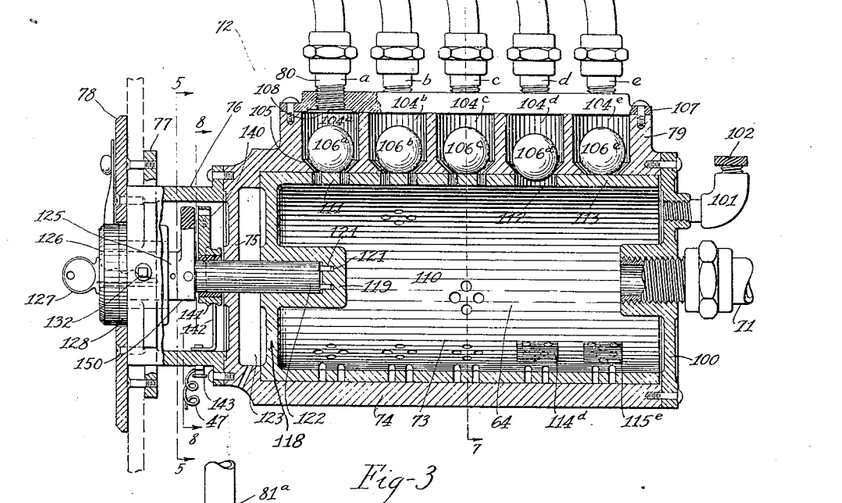
Fig. 3 is a partial left elevation and central vertical section of what may be termed the controller, comprising the central pressure chamber and the selective distributing means or valves, together with the cooperating means by which the controller may be set to bring about the several purposes of the invention.

From the pressure generator the fluid is shown conducted by a pipe 71 to the central instrument of the system, the controller 72, operating to distribute the pressure fluid from the central chamber 73 to the various motors, etc. The controller 72 is shown mounted in front of the vehicle dash, and comprises a main casting or cylinder 74, the rear wall 75 of which may be attached to a cylindrical support 76 having a flange 77 bearing directly against the dash. At the rear side of the dash, facing the driving seat, is a disk or selector dial 78 attached through the dash to the other elements. The main or cylindrical shell or casing 74 of the controller is shown formed with an upward extension 79 containing the adjustable valves to be described. Issuing from the extension 79 there are shown in Figs. 2 and 3 a series of short pipes or nipples 80 and marked respectively $a$, $b$, $c$, $d$, and $e$ so as to present a series of reference letters which can be carried through the connecting parts of the system to facilitate identification.

These elements 79 and 80 are shown in Fig. 2 in connection with the perspective of the controller 72, and for convenience again at a higher point in connection with a development of certain elements, so that in considering the connections from the exit nipples $a$, $b$, $c$, $d$ and $e$ we must pass from the lower to the upper part of the figure and thence on to the different parts of the vehicle.

Thus above the nipple $a$ is shown connecting tube or passage $81^a$, the destination of which may be traced diagrammatically in the upper part of the figure, showing that it extends to the front of the vehicle where it is connected by flexible tubes $82^a$ with the fluid motors 14 of the front wheel brakes. At an intermediate point a branch tube $83^a$ is connected and leads to the fluid motor 45 controlling the alarm switch 44, which opens with application of pressure.

The rigid tubes $81^a$ and others to be described may conveniently be copper tubes, each bent into the necessary path to conduct the fluid pressure to the terminal point, although other species of pipe or conduit might be employed. The flexible tubes or hose, such as $82^a$, are preferably inexpansible, but able to be flexed freely and extensively to permit the necessary motions of the front wheels etc. without hindrance or injury to the tubes. In some cases a short section of the flexible tubes could be of elastically expansible nature, such as strong resilient rubber, with the advantage that the expansion increases the capacity to receive liquid under pressure, so that notwithstanding minor leakage there will remain a reserve of pressure operating to maintain the brakes or other elements in position until the relaxing of pressure; this expedient being either supplementary to or a substitute for the cushion or elastic device 56 incorporated for an analogous purpose in the fluid motor.

From the second of the valve nipples $b$ is shown a tube or passage $85^b$, which extends to where it is coupled to a flexible tube $86^b$ extending to the fluid motor 19 of the left rear wheel brake; the flexible action of tubing allowing the necessary play between the rear wheel and the chassis or body.

The third valve nipple $c$ is connected by a rigid tube $88^c$ with a flexible tube section $89^c$ leading to the fluid motor 24 of the right wheel brake.

The fourth valve nipple $d$ connects with a tube $91^d$ extending to the fluid motor 30 which, as already explained, controls the devices for locking the hood and the transmission, and the switch or circuit closer for the self starter.

The fifth of the valve nipples $e$ is shown connecting by a tube $93^e$ to the fluid motor 39 for the left rear door bolt 38, with a branch connection $94^e$ extending to a similar bolt for the opposite door; or the one motor 39 may readily be connected to the bolts of the several doors.

Referring further in detail to the controller 72, shown more particularly in Figs. 2, 3 and 7, its casing or cylinder 74 is shown closed by a head 100 through which the pressure pipe 71 enters. In order to replenish the liquid a supply pipe 101 is shown closed by a removable plug 102; or a supply reservoir could be suitably connected. Above the main chamber 73 in the controller are a series of valve chambers $104^a$, $104^b$, etc., formed in the extension 79. These may be cylindrical chambers with conical or tapered lower ends or seats 105 adapted at times to receive the movable elements of the valves, which may advantageously consist of steel plugs or spheres $106^a$, $106^b$, etc., that may be cheaply procured and renewed, and afford great accuracy in cooperation with the accurately ground seat 105. A cover plate 107 is bolted on top of the extension 79 to close the valve chambers, and this plate may contain a cross bar or grating 108 beneath each of the exit nipples, to prevent the sphere rising and closing the exit to the valve chamber.

This invention, in its preferred embodiment, comprises a series of valves between the central pressure chamber 73 and the several fluid pressure motors, each valve preferably being changeable or adjustable at will so as to perform any one of three different functions. First, each valve may be held open so that free liquid flow in both directions is unimpeded. Second, each valve may be set to permit liquid flow from the chamber to the passages and motors, but not reversely into the chamber; in other words it becomes a check valve. Third, each valve may be wholly closed or blocked against flow in either direction. These three conditions are hereinafter referred to as open, check and blocked. In some cases the open-valve condition may be modified to permit return flow but prevent out-flow from the chamber, or reversely checked.

Seven different selective positions of the control systems are herein provided, determined by seven numbered positions on the dial 78. In each of these selective positions the adjustment determines the condition or operation of each of the five valves to afford the desired results or actions in the fluid pressure motors controlled thereby. Under certain conditions of driving the vehicle, or parking it, or braking the wheels, for which inscriptions may be applied to the dial, certain actions in the several controlled elements are herein provided as will be more fully explained.

The changes in the adjustment and action of the several valves may be effected and coordinated by a suitable means or selector for setting the several valves, herein shown as comprising a sleeve 110 rotatable with a close fit within the central cylinder 74 and constructed to cooperate with the five valves in the manner stated. The circumferential area or band of the sleeve corresponding with the position of each of the five valves may be considered as divided into seven surface units or areas, corresponding with the seven selector positions. There are thus shown seven times five or thirty-five effective sleeve surface units, some of which are indicated in the sectional views, Figs. 3 and 7, and all of which, in their preferred form, are diagrammatically shown in the developed sleeve 110 at the right hand part of Fig. 2.

These valve controlling units of the selector sleeve are of three kinds corresponding with the three valve actions mentioned. Thus the sleeve portion 111 indicates an open valve. It consists of one or more passages through the sleeve, from the interior chamber 73 to the valve chamber, so located that the valve body or sphere can not descend to its seat nor close the sleeve passages; four closely assembled apertures being indicated. As clearly seen in Figs. 3 and 7 the sphere is so held that the liquid can flow freely in both directions. The next type of sleeve unit 112 gives a checking action, this being a simple aperture sufficiently large to permit the valve sphere descending upon its seat, thus permitting out-flow of liquid to the connected motor but preventing return flow, and so locking the motor in its shifted position. The third type of sleeve area may be designated a blocking unit, indicated at 113, this being an imperforated sleeve portion entirely closing the passage into the valve chamber. For particular purposes to be described one of the "open" units or areas pertaining to the fourth or "$d$" valve, namely the seventh unit, is provided with a reverse checking device or interior flap 114$^d$, which allows liquid to return to the controller but prevents outflow from the controller. A similar flap 115$^e$ is shown applied to the open seventh unit of the sleeve pertaining to the fifth or "$e$" valve. For convenience the individual valve sleeve units may be designated by their position, for example, as on the developed sleeve in Fig. 2 where units "$d$—7" and "$e$—7" are the ones having the reverse checking flaps 114$^d$ and 115$^e$, corresponding with the "running" or seventh adjustment of the $d$-valve controlling the starter, transmission and hood and of the $e$-valve controlling the door bolts. The various units are distinguished by the symbols on the diagram, a plus sign being used for a blocking or unperforated unit. In addition to these described features of the valve sleeve surface there are also indicated a number of slotted openings 116 which serve for the relief of pressure in all the motors, allowing the liquid to run back from the entire pressure system into the controller chamber, namely, at a certain position of the selector, that is, when shifting between position No. 1 and position No. 7.

Figure 4:
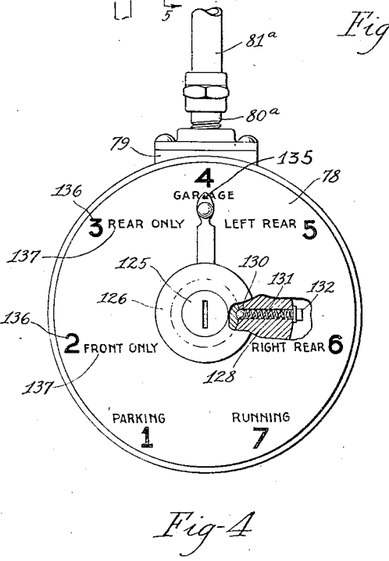
Fig. 4 is a front elevation of the parts shown in Fig. 3, looking toward the left side of Fig. 3.

The selector sleeve 110, which rotates within the cylinder 73 to adjust the five valves, may be open at its front end, as shown in Fig. 3, but closed at its rear end by its wall 118, which engages against an internal shoulder in the cylinder 74. The sleeve is to be rotated selectively to its seven different positions, and for this purpose the end wall 118 is shown as having an inwardly extending hollow boss 119, within which are holes 120 to receive pins 121 projecting endwise from what may be termed the selector shaft 122, so that rotation of the shaft will turn the sleeve. A recess 123 is shown between the wall 118 and the end wall 75 of the cylinder 74, with a passage to drain any liquid accumulating in the recess. The rear end of the selector shaft 122 may be attached to the rotary barrel 125 of a tumbler lock. This barrel is shown as having the usual enlarged disk or flange 126 at the exterior, overlying the dial 78 and facing the driving seat, and the usual key 127 is shown engaged in the tumbler barrel to render the same rotatable. The tumbler barrel may rotate within the lock casing 128 which may be fixed within the fixed support 76. When the key is inserted the tumbler barrel and selector shaft may be turned to the desired positions, and to assist determining the correct adjustments there may be a positioning stud or ball 130, as shown in Fig. 4, arranged to enter any one of seven notches in the periphery of the barrel 126, the ball being pressed by a spring 131 confined within the lock casing 128 by a plug 132. The lock preferably is of a kind wherein the key may be extracted at a plurality of positions, especially at positions Nos. 1 and 4, and it may be such that the selector must be adjusted to one of those two positions to enable the key to be extracted, thus ensuring a safe adjustment. In connection with these parts may be used a ratchet or similar device preventing the parts being shifted except clockwise or rightward except for example between positions Nos. 5 and 6 and between Nos. 7 and 1, where they may be shifted in both directions.

To indicate the respective adjustments of the parts there is shown an index or pointer 135 attached to the rotary face portion 126 of the tumbler barrel, and this may be formed with an enlarged extremity or knob so as to serve as a handle by which, in conjunction with the key 127, the operator may readily rotate the selecting parts to the desired position. The face of the dial 78 is shown provided with a series of numerals 136, for example the numerals 1 to 7 inclusive, and in connection with each of these is preferably applied a legend 137 indicating the adjustment or selective operation pertaining to each setting of the index. Thus in Fig. 4 the index finger is shown at position No. 4, and in Figs. 2, 3, 5, 7 and 8 the positions of the other selector parts correspond. The several legends may conveniently be as follows: 1. Parking, 2. Front only, 3. Rear only, 4. Garage, 5. Left rear, 6. Right rear, 7. Running. The various controls and actions pertaining to each of these adjustments will be further described after the complete description of the mechanical elements.

As stated, the control switch for the ignition circuit is adjusted through the selector device, this referring preferably to the low tension circuit, which, when cut off renders the engine inoperable. For the purpose of this control there is shown attached to but insulated from the selector shaft 122 a contact arm 140, see Figs. 3 and 8, extending radially from a hub 141. A brush 142 is shown in constant contact with the hub 141, this being mounted in an insulated manner in the fixed casing 76 and having an exterior binding post 143 from which the conductor 47 extends. The extremity of the radial arm 140 is adapted at certain points to contact against a fixed strip or brush 145 mounted within the casing 76 by insulating supports and having an exterior binding post 146 from which extends the conductor 48. The fixed contact strip it will be noticed extends only through the portion of the periphery corresponding to selector positions Nos. 5, 6 and 7. The result is that when the selector is in any of these positions the ignition circuit through conductors 47 and 48 will be closed and operative, whereas in any other position the circuit will be broken, preventing the running of the engine.

Figure 5:
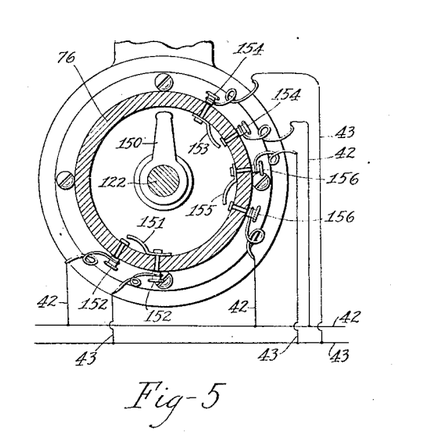
Fig. 5 is a partial cross section taken on the line 5—5 of Fig. 3, looking from the front.

The alarm circuit 42, 43 also may be controlled from the selector conjointly with the fluid pressure control through switch 44 already mentioned. Thus in Figs. 3 and 5 is shown a circuit closing and opening arrangement placed in the circuit 42, 43 and in series with the switch 44, so that the alarm 40 will sound, when, and only when, the circuit is closed at both points. For this purpose a contact closing arm or cam 150 is shown attached to the selector shaft 122. Fig. 5 shows that there are a series of contact pairs within the cylindrical casing 76, each adapted to be closed in a certain position of the arm 150. Thus a flexible spring or leaf contact 151 is shown arranged to close the circuit between insulated binding posts 152 from which binding posts extend branches of the conductors 42, 43, the contact 151 being in position corresponding with index No. 1, so that when the shaft and arm 150 swing to this position the circuit 42, 43 will be closed, unless indeed it is opened by the switch 44. A similar leaf contact 153 is arranged between similar posts 154 similarly connected with the wires 42, 43; this contact being located at selector position No. 5. A third such leaf contact 155 extending between similar posts 156 gives a third position, corresponding with No. 6 of the selector. From this arrangement it follows that when the index is set at positions 2, 3, 4 or 7 the alarm circuit will be open and the alarm can not sound, but when at positions 1, 5 or 6 the circuit 42, 43 will be closed at this point and the alarm will be sounded unless the switch 44, at another part of the circuit is open, as indicated in dotted lines in Fig. 2. The illustrated adjustment shows the switch 44 closed, but all of the alarm contacts 151, 153 and 155 open, so that the alarm will not sound under these conditions.

To facilitate the description of the controls the following table is presented showing in the seven numbered columns the results of the seven adjustments of the selector, the results of the fluid pressure operation being indicated on the supposition that the index is set to the desired number and the fluid pressure pedal then forced forwardly to cause the operations.

|  | 1 Parking | 2 Front only | 3 Rear only | 4 Garage | 5 Left rear | 6 Right rear | 7 Running |
|---|---|---|---|---|---|---|---|
| Valve A | Ch | Ch | Op | Op | Bl | Bl | Op |
| Fr. brakes | Lock | Lock | On | On | Off | Off | On |
| Alarm switch | Open |  |  |  | Close | Close |  |
| Valve B | Ch | Op | Ch | Op | Op | Bl | Op |
| L. R. brake | Lock | On | Lock | On | On | Off | On |
| Valve C | Ch | Op | Ch | Op | Bl | Op | Op |
| R. R. brake | Lock | On | Lock | On | Off | On | On |
| Valve D | Ch | Ch | Bl | Ch | Bl | Bl | R-ch |
| Starter switch | Open | Open |  | Open |  |  | Close |
| Trans. lock | Lock | Lock |  | Lock |  |  | Open |
| Hood locks | Lock | Lock |  | Lock |  |  | Open |
| Valve E | Ch | R-Ch | Bl | Bl | Bl | Bl | R-Ch |
| Door bolts | Lock | Open |  | Open |  |  | Open |
| Ign. switch | Open | Open | Open | Open | Close | Close | Close |
| Alarm contact | Close | Open | Open | Open | Close | Close | Open |

Thus when adjusted to position 1 for parking, the operator, by thrusting the pedal, effects the actions entered in column 1. The selector adjustment puts all the valves in check position. All four brakes are applied and locked; the starter control switch is opened; the transmission and hood locks are locked, also the door bolts; the ignition switch is opened; and the alarm contact on the selector shaft is closed, while the alarm switch 44 is open, so that the alarm is silent unless and until accidentally or otherwise the hydraulic pressure is reduced below an effective pressure, which will close the switch and sound the alarm, thus calling attention to the condition and giving notice so that the operator can attend to the difficulty. The described adjustments are ideal for parking purposes, and are all produced by the simple setting of the index and depression of the pedal.

Index position No. 2 is useful for example when it is desired to change rear tires. The depressing of the pedal applies and locks the front brakes, but not the rear brakes. The adjustment otherwise is similar to No. 1 except the door bolts are open and the alarm contact open.

The adjustment No. 3 enables the rear brakes only to be applied, useful on various occasions, for example, to change a front tire.

Position No. 4 is suitable for garage purposes. The four brakes will be "on" or applied when the pedal is pressed, but not locked, so that the attendant can move the car around the garage; the door bolts are open to give access to the interior, but the starter switch, transmission and hood locks and the ignition switch are in positions to prevent operation, as in the parking adjustment.

Position No. 5 enables the operator to throw on the left rear brake while the other three brakes are blocked and inoperative. This is very useful in case the left rear wheel is slipping as in a mud hole, and enables the car to be driven by the other rear wheel. The alarm guards against leaving the parts in this adjustment since in this adjustment the alarm switch 44 will be closed, and the alarm contact being closed, the horn will sound. Position No. 6 is the reverse of No. 5, enabling the right rear wheel alone to be braked.

The ordinary running position is No. 7, and valves $a$, $b$ and $c$ are open while valves $d$ and $e$ are reversely checked by the interior flaps, preventing pressure being delivered to the starter switch, transmission and hood locks the door bolts. Upon pressing the pedal all of the brakes will be applied but not locked, the release of the pedal releasing the brakes. The ignition switch is closed and the engine operative, while the alarm contact is open, so that everything is in suitable position for ordinary road driving.

Explaining further the several valve control means on the selector sleeve the "open" units connote an operative condition so that pressure of the pedal will apply the brake or other appliance and let-up of the pedal will release it. The "check" units indicate also an operative condition, but with the appliance locked or checked in applied position. The "blocking" units give an inoperative condition, the pedal pressure being unable to apply the appliance; but if the appliance is already applied this unit may operate to so lock it, unless provision is made for pressure relief. The "reverse checking" units also connote an inoperative connection, the pressure being blocked from access to the appliance, but in case the appliance has been operated this unit gives pressure relief, allowing the liquid to flow back to the pressure chamber. Such an arrangement is shown not only at $114^e$ and $115^e$, but also at unit $e$—2. Relief slots between units, such as 116, permit the back flow of liquid to the pressure chamber when passing from one position to another. As stated there are such slots for each valve between positions 1 and 7, and they may be provided at other suitable places for example at $116^e$.

Various modifications of the units can be made. For example where two checking units are arranged in succession they may be connected by a wide slot so that the parts will remain in checked position during the shifting from one position to the other. Thus between position $a$—1 and position $a$—2 is shown a wide connecting slot $117^a$, and between positions $d$—1 and position $d$—2 is a similar slot $117^d$. As a result, if the system is set in parking position No. 1 it will be possible to swing the selector from position No. 1 to position No. 2, without releasing the front brakes or the locks for the transmission and hood, while changing the door bolt unit from check position to reverse check position, thus relieving the pressure and permitting the doors to be opened. The rear wheel brakes will also be released by this movement, but the car still remaining inoperative through the front wheel brakes, the transmission and hood locks and the opened starter switch.

The principles of the invention may be variously applied. The total number of valves may be reduced, namely by operating a larger number of motors on each valve line. For example the bolts which lock the doors could be operated by motor on the same pipe line with the locks for the hood and transmission. Also the total number of fluid pressure motors can be reduced by making a single motor perform the function of several, through mechanical, electrical or other connections. An alarm similar to that shown in connection with the brakes could also be used in connection with the several locking appliances. The control of the door locks could be varied to enable the vehicle doors to be selectively locked while running, which may be advantageous in connection with a motor bus. The invention is useful with vehicles of various types, for example a four wheel drive vehicle, a vehicle with only three or two wheels, or one having six wheels or a trailer.

As stated the invention may be considered broadly without respect to the use of fluid pressure devices and connections, and for this purpose the essential elements may be described broadly in the following terms, used also in certain of the claims. The prime element for delivering the operating force may be termed an actuator, this being moved by foot pressure or otherwise to give the necessary power thrust to actuate the entire system, and being specifically herein illustrated as a fluid pressure generator in the form of a pedal operating upon a liquid thrusting piston. Next is a member by which the thrust is delivered or distributed to the several trains of connections, this being specifically shown as a central pressure chamber receiving the thrust liquid and delivering portions thereof to the several pipe lines. A controlling selector or controller may be set at will to desired positions according to the operations desired in the wheel brakes and other terminal appliances; this being shown as a rotary selector in the nature of a cam or sleeve operating to adjust the several control devices or valves. This may have an operating shaft which may also carry certain switch operating arms or cams. An index and dial indicate the several adjustments, and a lock and key put the operation in the owner's control. Next come a plurality of control devices adapted to be selectively adjusted by the selector. If mechanical these would be in the nature of latches, triggers, pawls, stops and the like. Five of these control devices are shown as fluid pressure valves adjusted by means of the selector sleeve, and two of them are shown as control switches, one for the ignition and the other for the alarm. When the selector has been set the valves serve to communicate the actuating force through trains of transmitting connections to the terminal appliances. Mechanically these would take the form of links, levers, slides, wheels, belts, cords and the like. They are shown as consisting of a pipe line from each of the valves, and each of the pipe lines terminating with one or more motors for converting the pressure into motion. The terminal appliances or elements of the vehicle controlled by the illustrated embodiment of this invention are the front brakes, and the pressure operated switch for the alarm, controlled from the $a$-valve; the left rear brake controlled from the rear $b$-valve; the right rear brake controlled from the $c$-valve; the starter switch and the locks for the transmission and the hood controlled from the $d$-valve; and the bolts or locks for the vehicle doors controlled from the $e$-valves; to which may be added the ignition means controlled from one of the control switches on the selector shaft, the other of such control switches controlling the operation of the alarm pressure switch operated through the $a$-valve.

There has thus been described a motor vehicle control system embodying the principles and attaining the objects of the present invention; and as various matters of combination, coordination, arrangement, operation, construction and detail, may be extensively modified without departing from the principles of the invention it is not intended to limit the claims to such matters except so far as set forth in the appended claims.

What is claimed is:

1. In a motor vehicle control system the combination of a movable actuator adapted to deliver the force for operating a plurality of terminal appliances, a controlling selector adapted to be set at will to different positions, a plurality of control devices adapted to be selectively adjusted by the selector, and transmitting connections from the respective control devices to the several terminal appliances through which the latter may be operated in a preselected manner by the movement of the actuator.

2. A system as in claim 1 and wherein the terminal appliances include brakes for the vehicle wheels, and the control devices being adapted to render the respective brakes operable, or locked in applied position, or inoperable.

3. A system as in claim 1 and wherein the front brakes are controllable separately from the rear brakes.

4. A system as in claim 1 and wherein the right and left rear brakes are separately controllable.

5. A system as in claim 1 and wherein the selector is adapted to be movably set to several positions and thereby adjust the control devices to render the several terminal appliances operable or inoperable by the actuator.

6. A system as in claim 5 and wherein the selector has an index device indicating its several adjustments.

7. A system as in claim 5 and wherein the selector has an index device indicating its several adjustments and means for locking it against change of setting.

8. A system as in claim 1 and wherein one of the terminal appliances is an alarm switch arranged to be closed by the release of a brake or brakes.

9. A system as in claim 1 and wherein one of the terminal appliances is an alarm switch arranged to be closed by the release of a brake or brakes, and in series therewith a control switch adjusted by the selector.

10. A system as in claim 1 and wherein the right and left rear brakes are separately controllable, with an alarm control switch closed by the selector when the right or left brakes are adjusted for separate operation.

11. A system as in claim 1 and wherein the terminal appliances include wheel brakes, and a switch pertaining to the engine.

12. A system as in claim 1 and wherein the terminal appliances include wheel brakes, and lock means for parts of the motor vehicle.

13. In a vehicle a single means operable from the driving seat for controlling the applying of the brakes and the locking of parts of the motor vehicle.

14. In a vehicle a single means for rendering inoperative the engine starter and the ignition means.

15. In a vehicle a single means for locking the transmission and other parts of the vehicle.

16. A system as in claim 1 and wherein the selector has a "parking" position whereby the control devices are adjusted so that the brakes will be applied and locked upon operation of the actuator, and so that the switches will be open, and lock means will be locked.

17. A system as in claim 1 and wherein the selector has a "parking" position whereby the control devices are adjusted so that the brakes will be applied and locked upon operation of the actuator, and so that the ignition or starter switches will be open, and transmission or hood or door lock means will be locked; and a "running" position whereby the brakes will be operable but not locked, and the ignition or starter switches closed, and the transmission lock means unlocked.

18. A system as in claim 1 and wherein the selector has a "parking" position whereby the control devices are adjusted so that the brakes will be applied and locked upon operation of the actuator, and so that the ignition or starter switches will be open, and transmission or hood or door lock means will be locked; and a "running" position whereby the brakes will be operable but not locked, and the ignition or starter switches closed, and the transmission lock means unlocked; and a "garage" position whereby the brakes will be operable, and the ignition or starter switches open, and the transmission locked.

19. A system as in claim 1 and wherein the selector has a "parking" position whereby the control devices are adjusted so that the brakes will be applied and locked upon operation of the actuator, and so that the switches will be open, and lock means will be locked; and a "running" position whereby the brakes will be operable but not locked, and the switches closed, and the lock means unlocked; and a "left rear" position whereby the left rear brake will be operable but the others inoperable, and the ignition switch closed.

20. A system as in claim 1 and wherein the selector has a "parking" position whereby the control devices are adjusted so that the brakes will be applied and locked upon operation of the actuator, and so that the ignition or starter switches will be open, and transmission or hood or door lock means will be locked; and a "running" position whereby the brakes will be operable but not locked, and the ignition or starter switches closed, and the transmission lock means unlocked; and a "left rear" position whereby the left rear brake will be operable but the others inoperable, and the ignition switch closed, together with an alarm switch closed by the selector when so set.

21. In a motor vehicle control system the combination of a fluid pressure generator adapted to deliver the force for operating a plurality of terminal appliances, such as brakes, locks and switches, a controlling selector adapted to be set to different positions, a plurality of control valves adapted to be selectively adjusted by the selector, and a system of fluid pipe lines and motors, extending from the respective control valves to the several terminal appliances through which the latter may be operated in a preselected manner by the operation of the fluid pressure generator.

22. A system as in claim 21 and wherein one or more valves control the operation of brakes, and have three selective positions, first open, rendering the brake operable, second checked, causing the brake to be applied and locked, third, blocked, rendering the brake inoperable.

23. A system as in claim 21 and wherein the selector comprises a rotary member or sleeve cooperating with the valves to adjust them according to the selector position.

24. A system as in claim 21 and wherein the selector comprises a rotary member or sleeve cooperating with the valves to adjust them according to the selector position, a casing containing the selector sleeve and a central pressure chamber, and means for rotating the sleeve to its several positions.

25. A system as in claim 21 and wherein the selector comprises a rotary member or sleeve cooperating with the valves to adjust them according to the selector position, a casing containing the selector sleeve and a central pressure chamber, and means for rotating the sleeve to its several positions comprising a selector shaft, and a dial and index determining its position.

26. A system as in claim 21 and wherein the selector comprises a rotary member or sleeve cooperating with the valves to adjust them according to the selector position, a casing containing the selector sleeve and a central pressure chamber, and means for rotating the sleeve to its several positions comprising a selector shaft, and switch control devices operated from said shaft.

27. A system as in claim 21 and wherein one of the terminal appliances is an alarm switch, and means operated by the fluid pressure to close said switch when the pressure falls below a predetermined pressure.

28. A system as in claim 21 and wherein control valves control pressure to brakes, an alarm switch controlled by the pressure operating the brakes, so as to close when the pressure is ineffective, and a control switch in series with the alarm switch, closed in certain positions of the selector.

29. In a motor vehicle control system the combination of a liquid pressure generator adapted to deliver liquid thrust for operating a plurality of terminal appliances, a controlling selector adapted to be set to different position, a plurality of liquid control valves adapted to be selectively adjusted by the selector, and a system of liquid pipe lines and motors, extending from the respective control valves to the several terminal appliances through which the latter may be operated in a preselected manner by the actuation of the liquid pressure generator.

30. A system as in claim 29 and wherein the valves comprise movable portions cooperating with seats, and the selector cooperates by cam action with the movable valve portions.

31. A system as in claim 29 and wherein the valve comprises a movable plug or ball adjacent a seat, and the selector comprises a rotary sleeve adapted to cooperate with all the valves, first to open any of them by forcing the plug from the seat, second to give checking effect by allowing the plug to rest on the seat, third to close the valve against liquid flow.

32. A system as in claim 29 and wherein the motors have return springs thrusting the liquid back to the generator when released.

33. A system as in claim 29 and wherein a motor has a cushion element adapted to yield resiliently under pressure and thus store liquid and maintain pressure under leakage.

34. A hydraulic motor having an element or piston moved by liquid pressure, a spring for returning it to normal, and a heavier spring or cushion arranged to yield with pressure and maintain pressure despite leakage.

35. In combination with a liquid pressure generator, a pipe line to the appliance to be operated, and a cushion device in said pipe line, arranged to yield and give capacity to receive liquid, and to reassert itself to maintain pressure despite leakage.

In testimony whereof, I have affixed my signature hereto.

JOHN J. GARDNER.